No. 729,215. PATENTED MAY 26, 1903.
C. A. PARSONS.
STEAM TURBINE.
APPLICATION FILED OCT. 6, 1902.
NO MODEL. 7 SHEETS—SHEET 1.

Fig. 1.

Attest:
C. A. Middleton
Edw. L. Reed

Inventor:
Charles A. Parsons.
by Ellis Spear
Atty.

No. 729,215. PATENTED MAY 26, 1903.
C. A. PARSONS.
STEAM TURBINE.
APPLICATION FILED OCT. 6, 1902.
NO MODEL. 7 SHEETS—SHEET 2.

Inventor
Charles A. Parsons

No. 729,215. PATENTED MAY 26, 1903.
C. A. PARSONS.
STEAM TURBINE.
APPLICATION FILED OCT. 6, 1902.

NO MODEL. 7 SHEETS—SHEET 3.

Attest:
C. Middleton
Edward Saxton

Inventor:
Charles A. Parsons
by Ellis Spear
Attʸ

No. 729,215. PATENTED MAY 26, 1903.
C. A. PARSONS.
STEAM TURBINE.
APPLICATION FILED OCT. 6, 1902.
NO MODEL. 7 SHEETS—SHEET 5.

No. 729,215. PATENTED MAY 26, 1903.
C. A. PARSONS.
STEAM TURBINE.
APPLICATION FILED OCT. 6, 1902.
NO MODEL. 7 SHEETS—SHEET 6.

Fig. 9.

Attest:
O. Minnaitan
Edw. L. Reed

Inventor
Charles A. Parsons.
by Ellis Spear
Atty.

No 729,215. Patented May 26, 1903.

UNITED STATES PATENT OFFICE.

CHARLES ALGERNON PARSONS, OF NEWCASTLE-UPON-TYNE, ENGLAND.

STEAM-TURBINE.

SPECIFICATION forming part of Letters Patent No. 729,215, dated May 26, 1903.

Application filed October 6, 1902. Serial No. 126,247. (No model.)

*To all whom it may concern:*

Be it known that I, CHARLES ALGERNON PARSONS, engineer, a subject of the King of Great Britain and Ireland, and a resident of Heaton Works, Newcastle-upon-Tyne, in the county of Northumberland, England, have invented certain new and useful Improvements in Steam-Turbines, (for which I have made application for Letters Patent in Great Britain, No. 6,142, bearing date March 12, 1902,) of which the following is a specification.

My invention relates to steam-turbines of the Branca or de Laval type in which steam is expanded from the initial to the terminal pressure in one stage or operation. In such steam-turbines the steam is expanded in suitably-formed nozzles having a cross-section of expanding area, and a velocity is attained corresponding to the entire fall of pressure. Steam at this high velocity impinges on buckets or vanes formed to receive the impact and by deflection of flow secures reactive force upon the rotor. In turbines of this class as at present constructed certain difficulties are experienced, due principally to the extreme angular and peripheral velocities required by the rotating wheel. This gives rise to excessive stresses in the material of the wheel, to difficulties in the transmitting-gear, and to frictional losses due to the high superficial velocity of a large wheel-surface immersed in the low-pressure steam.

The object of my invention is to greatly reduce the required angular and peripheral velocities, thus avoiding the difficulties of gearing down and to minimize the frictional losses due to rotation in the low-pressure steam, while greatly improving the efficiency of the turbine itself.

My invention consists, broadly, in a new steam-turbine of this class in which the steam-jets are caused to rotate in a direction opposite to the direction of rotation of the bucket-wheel, a high relative velocity between jet and bucket being thus obtained, while the actual angular and peripheral velocities are greatly reduced.

My invention further consists more specifically in the steam-turbines hereinafter described and in detail methods of applying it to various purposes.

By means of my new turbine I overcome the difficulties referred to above, an important departure in this invention being the great diminution of skin-friction on the moving elements which is secured. For instance, assuming an initial velocity of the steam discharged from the nozzles to be five thousand feet per second, a relative velocity between nozzle and bucket of fifteen hundred feet per second is necessary to secure good efficiency. With fixed nozzles this necessitates a peripheral velocity of the bucket-wheel of fifteen hundred feet per second, which is excessive for even the strongest materials; but the same relative velocity is secured by my present invention with a peripheral velocity for each element of only seven hundred and fifty feet per second, which involves only one-quarter the stress on the material of the disk. Comparing a given relative velocity between the rotating nozzles and the bucket-wheel and the same relative velocity in the turbine with fixed jets acting on a moving wheel, the angular velocity being the same in each case, the diameter required for each of the two rotating wheels is only one-half that of the single-wheel turbine, and therefore the surface of each disk is only one-quarter that of the older form. Further, the horse-power absorbed in overcoming the skin-friction of the disk varies as the cube of their mean superficial velocity and directly as the area exposed. Hence considering the outside surfaces only of the disk the horse-power absorbed is only one thirty-second part of that in the older form. With regard to the space between the two disks, assuming the loss equal to what it would be were one disk stationary and the other moving with the same relative velocity, the horse-power absorbed on this account is one-eighth part of that in the older form, so that summing up the total skin-friction losses in the double-moving-element type are only about one-sixth of those in the single-element type when constructed for the same relative velocity of jet and bucket. Thus a steam-turbine constructed in accordance with my invention, compared with a single-wheel turbine of the Laval type, giving the same theoretical efficiency, sets up stresses in the wheels of one-quarter, and gives steam-friction losses of only one-sixth of the Laval.

Referring to the accompanying drawings.

Figure 1:
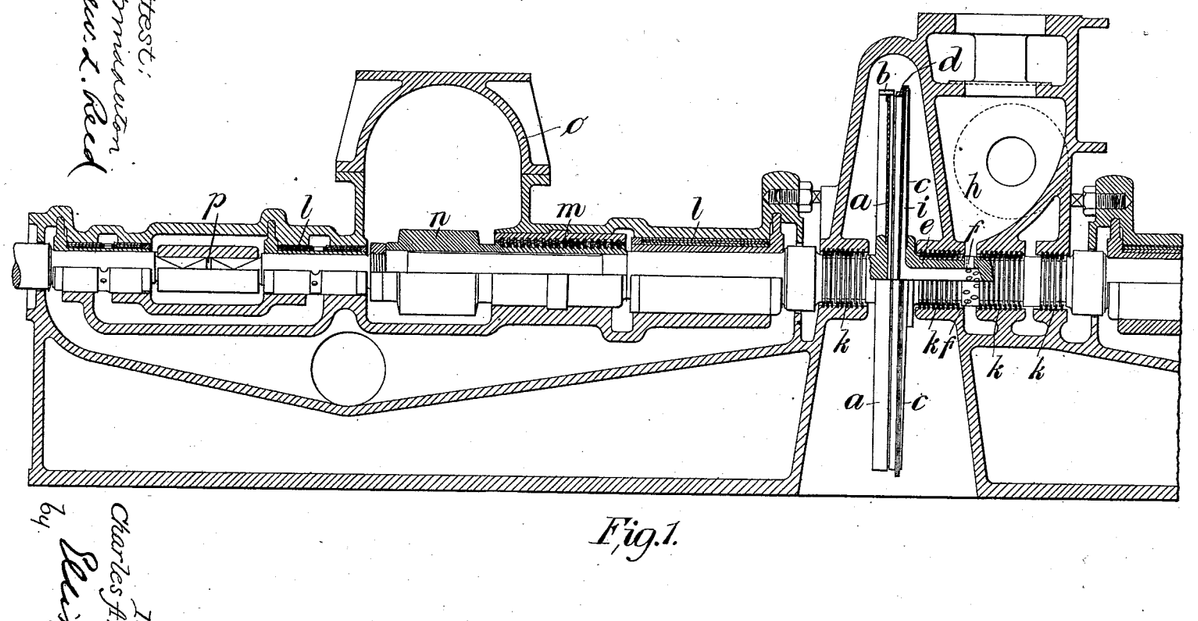
Figure 1 shows one form of my invention applied, for example, to the driving of dynamos.
Figure 2:
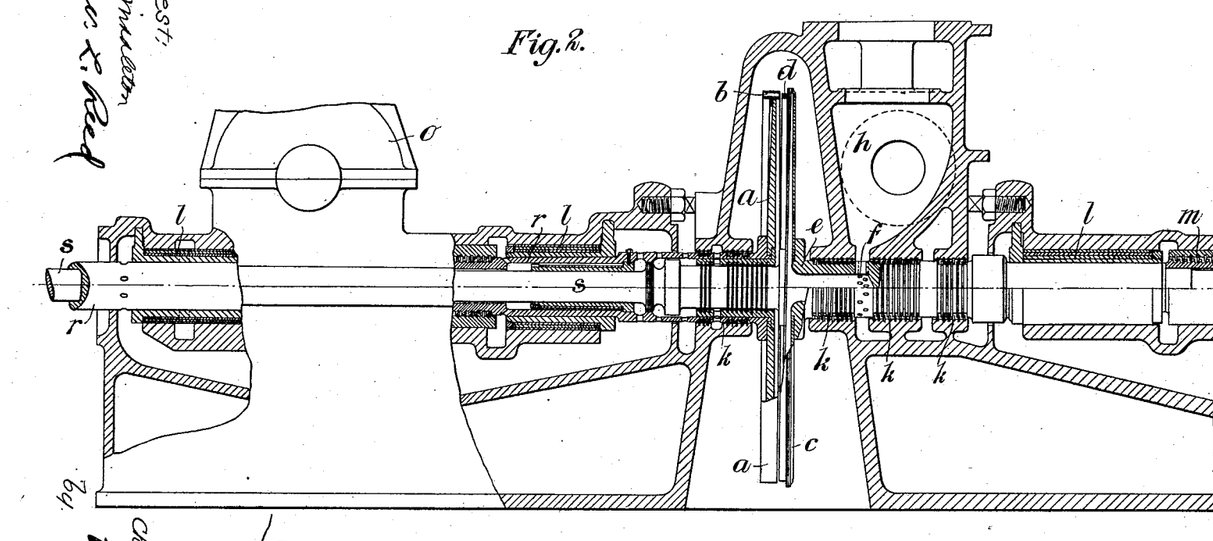
Fig. 2 shows another form suitable for marine propulsion, Fig. 3 being a detail view of one arrangement of propellers.
Figure 3:
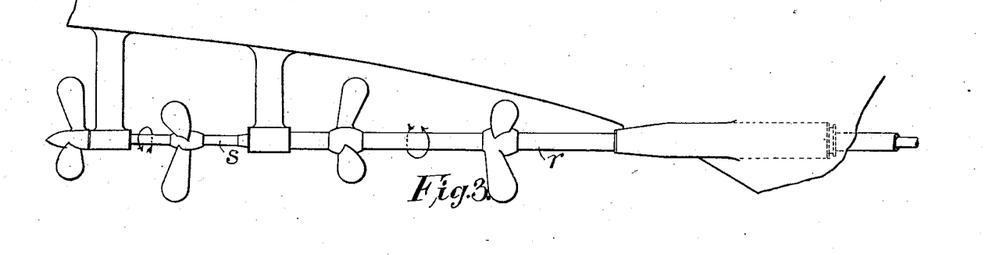
Figure 4:
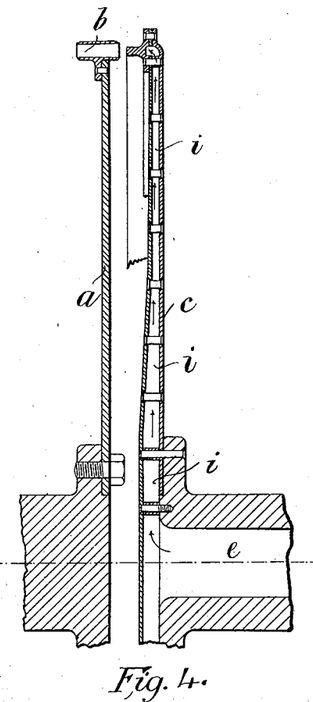
Fig. 4 shows part sections of the turbine-wheels, and Figs. 5 and 6 corresponding elevations.
Figure 5:
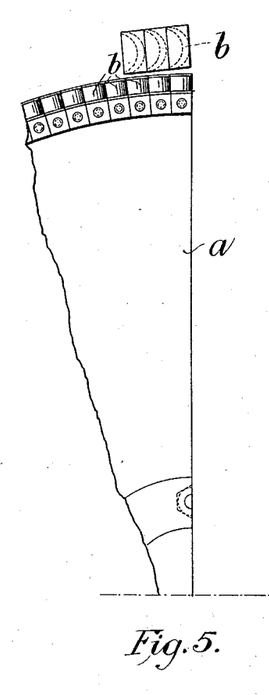
Figure 6:
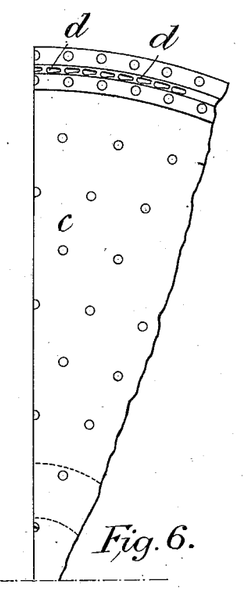

According to one form of my invention I construct a rotating wheel $a$, (see Figs. 1 and 2,) carrying buckets $b$ of suitable formation, such as are used in the Pelton wheels or in de Laval turbines. The actual vanes on which the steam impinges are so disposed that the steam after imparting energy to the buckets passes on direct to the exhaust without "rebounding" or interfering in any way with the action of succeeding jets. Adjacent to this bucket-wheel I mount a hollow wheel $c$, carrying the nozzles $d\ d$. I introduce steam at the initial pressure to the said hollow wheel by way of a hollow spindle or shaft $e$, the steam passing through holes $f\ f$, bored in this shaft on its way from the steam-chest $h$. The steam flows through the nozzles $d\ d$ and impinges upon the buckets carried by the bucket-wheels. The wheels rotate in opposite directions and preferably at equal or similar angular velocities. Then as the reaction of the jets and the impact on the buckets are equal or similar on the assumption that the steam on leaving the buckets is at or nearly at rest and acts in a direction tangential to the bucket circle the power delivered to each moving element will be the same. I prefer to mount the nozzles $d\ d$ on the circumference of a suitably-constructed wheel $c$ of steel (see Fig. 4) of coned formation for resisting centrifugal force and containing chambers $i\ i$ for conveying the steam from the hollow of the shaft $e$ near the axis. The wheel is preferably mounted overhung, as shown in Fig. 1, on a massive hollow shaft $e$, passing through the steam-admission chest $h$ and suitably packed with dummy packings $k\ k$ of my well-known construction. Beyond these packings I arrange suitable bearings $l\ l$ for carrying the shaft. The other wheel or element $a$, carrying the buckets $b$, is similarly mounted on a massive shaft and runs in similar bearings. The end adjustment of the shafts is secured by adjustable thrust-bearings $m\ m$, by which means the steam-packings $k\ k$ are maintained in close steam-tight adjustment and any end pressure due to the reaction of the jets or impact on the buckets is sustained. As indicated at $n\ n$, I may cut worms on the shaft-gearing with corresponding worm-wheels, (not shown,) the shafts of which may operate air-pumps or other auxiliary engines. The casings $e\ e$ are those in which the worm-wheels run. The arrangement for oiling the bearings is according to my well-known method. When used for driving dynamos, I preferably couple a dynamo to each member by any suitable coupling $p\ p$ and connect the dynamos in parallel. In some cases I may use concentric or hollow shafts and mount the armature and field magnets, respectively, on the two members. Any suitable method may be adopted for governing. When used for marine propulsion, (see Fig. 2,) I preferably use concentric shafts, such as $r\ s$, and mount on each one or more propellers, or bow and stern screws may be employed. A suitable arrangement of propeller is shown in Fig. 3, the outer shaft being fitted with left-handed propellers and the inner shaft with right-handed ones.

I may so form the dummy packings $k\ k$ as to take some or all of the thrust, or, if desired, I may mount one or more balance-pistons fed with steam from the main steam-chest for the same purpose. I may also, if desired, have more than one row of jets and one row of buckets arranged, preferably, at different radii, but still keeping all the jets on one wheel and all the buckets on the other, or I may have one or more rows of jets and one or more rows of buckets combined on each wheel with corresponding rows of buckets and jets on the other wheel.

Figure 7:
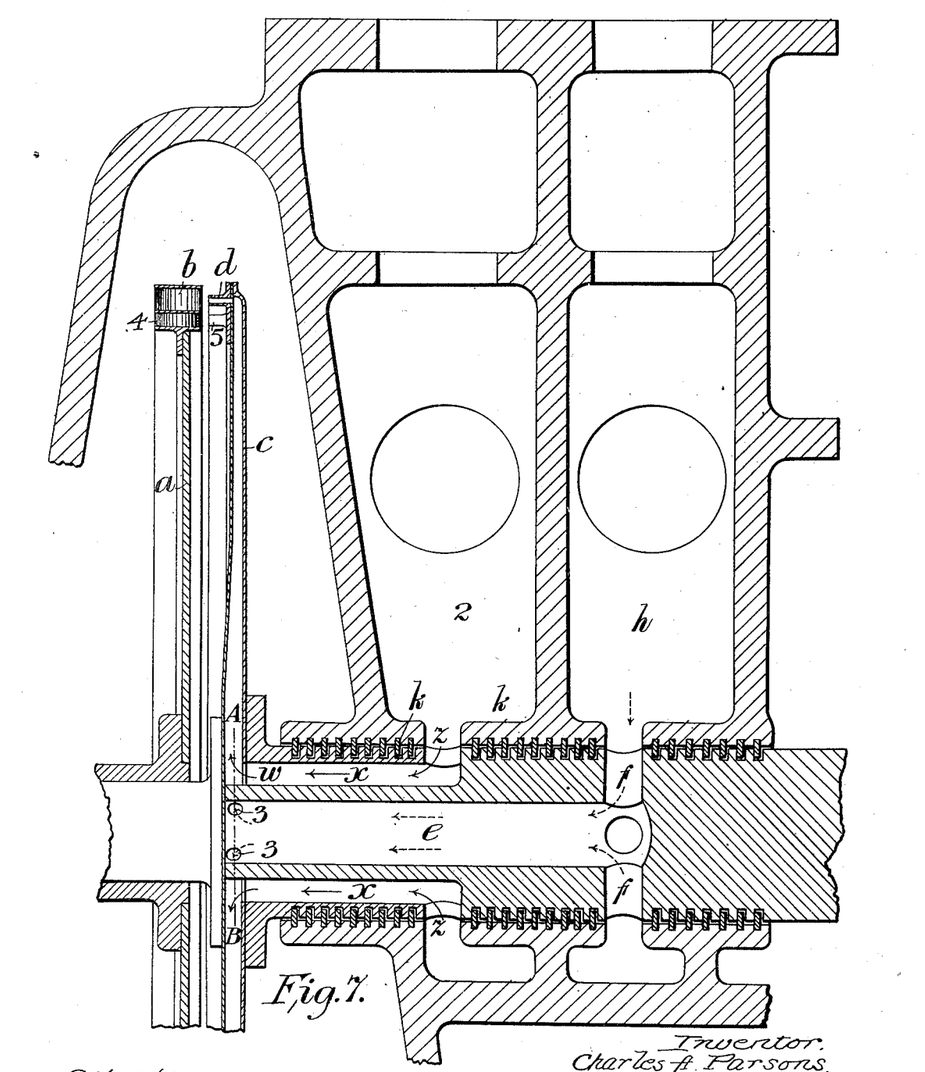
Fig. 7 is a sectional elevation, showing one method of reversing, Fig. 8 being a view of the jet-wheel shown partly as a section on the line A B of Fig. 7.

When reversing power is required, I may mount a separate set of nozzles supplied with steam from a separate set of passages and fed from a separate steam-chest. These jets will play on the reverse sides of the buckets or on special reverse buckets. According to one modification I carry this method of reversing into effect by means of the apparatus shown in Figs. 7 and 8. The jet-wheel $c$ is made hollow, as described above; but it is divided by radial partitions $t\ t$ into segments $u\ u$ and $v\ v$. The segments $u\ u$, which are preferably larger than the segments $v\ v$, communicate by means of openings $w\ w$ in the wall of the jet-wheel with an annular passage $x$, cut in the shaft on which the jet-wheel is mounted, holes $z$ being bored through the outside wall of this shaft to put the annular passage $x$ into communication with the pressure-chest 2. The segments $v\ v$ can in this way be continuously fed with steam, which issuing from the nozzles $d$ impinges on the buckets $b$ and drives the turbine in the ahead direction. The smaller segments $v\ v$ are used for reversing purposes and communicate by means of holes 3 3 with the central hollow $e$ of the shaft, and thence by means of holes $f\ f$ with the pressure-chest $h$ in a manner very similar to that described with reference to Figs. 1 and 2. These reversing-segments $v$ may be supplied with reversing-nozzles, arranged at the same distance from the center of the shaft as the ahead nozzles $d$, in which case the jets will impinge on the reverse side of the buckets $b$; but to insure a higher efficiency I prefer to use special reversing-buckets 4, arranged at a somewhat less radius than the ahead buckets, as shown in Fig. 7, with corresponding nozzles 5 5. The path of the entering steam is indicated by the arrows.

Figure 9:
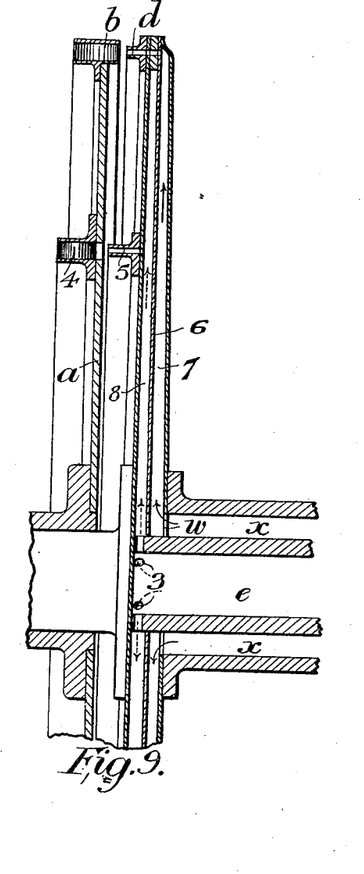
Fig. 9 shows sections through the bucket and jet-wheels adapted for reversing according to another modification, while finally

I carry the broad method of reversing just described into effect according to a second modification, as shown in Fig. 9. Instead of dividing the jet-wheel into segments by means of radial partitions I divide it into two portions by means of the partition 6, at right angles to the axis of the shaft. One of these portions 7 is provided with ahead jets $d$, as above, and communicates with its pressure-chest by means of holes $w$ and annular passage $x$. The other portion 8 supplies steam to the reversing-nozzles 5, being itself fed with steam by way of the central hollow $e$ of the shaft and holes 3 in a precisely similar manner to that shown in detail in Fig. 7. The reversing-nozzles 5 may be put at any convenient distance from the center of the shaft, the steam issuing from them impinging on the reverse-buckets 4.

Figure 10:
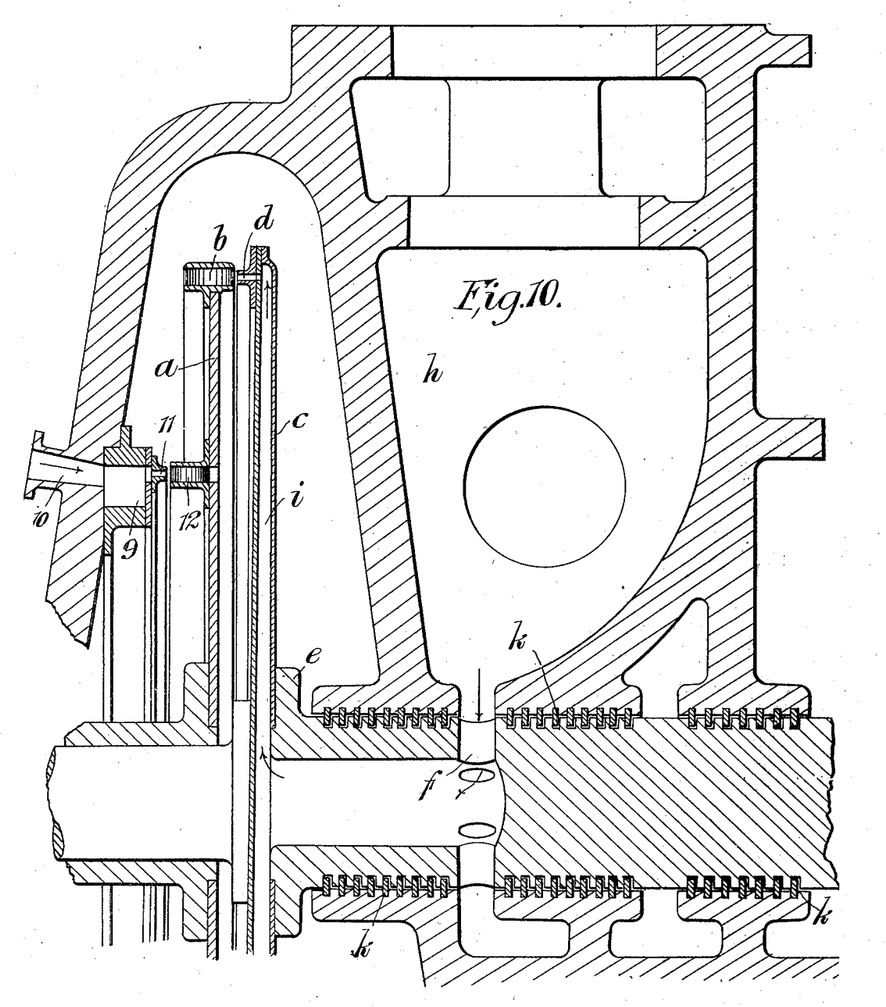
Fig. 10 is a sectional view showing a method of reversing one element only by means of a set of fixed jets.

According to another method of reversing I may cause one member only to reverse by fixed jets playing on special reversed buckets. Fig. 10 shows one modification of apparatus for carrying this into effect. The bucket and nozzle wheels are arranged as in Figs. 1 and 2 and are denoted by the same reference-letters; but an annular passage (shown in section at 9) is secured to the main casing of the turbine and supplied with steam for reversing purposes through the opening 10. This annular passage distributes steam to the fixed reversing-nozzles 11, the issuing-jets playing on the reversing-buckets 12, or, again, I may reverse one or both members by fixed jets and rows of buckets mounted on the periphery of one or both members, as described in my United States Patent No. 553,659 for the application of the steam-turbine to marine propulsion.

Figure 8:
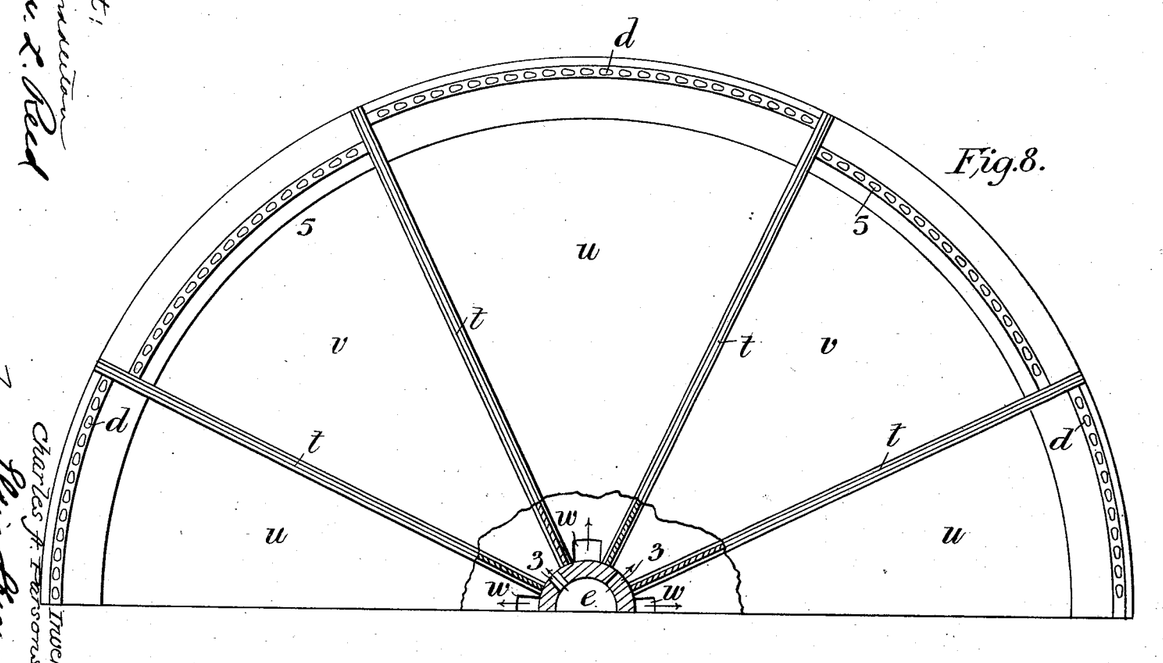

Instead of one set of nozzles $d\,d$ on one moving member, as described above in relation to the non-reversible type, I may have two or more sets of nozzles fed from separate steam chests or passages, (in a manner which will be evident from the description relating to Figs. 7, 8, and 9,) so that at reduced powers the number of jets may be reduced and the steam-pressure on the remainder may be increased for attaining efficiency.

By my new method I produce a steam-turbine of remarkably simple construction which in operation allows great reduction in the losses from the skin-frictional resistance, and this renders the single-expansion type for the first time admissible for direct coupling to dynamos or screw-propellers or other purposes where the speed of revolution is moderate. Because of these serious skin-friction losses such single-expansion turbines have hitherto been made of smaller diameter and run at extreme angular velocities. Such velocities can only be satisfactorily utilized for the purposes above mentioned by using intermediate reduction-gear, a method of working which is not practicable except for comparatively small powers.

Having now described my invention, what I claim as new, and desire to secure by Letters Patent, is—

1. An elastic-fluid-pressure turbine of the de Laval type, consisting of two coaxial elements rotating in opposite directions, the one carrying expanding nozzles and the other carrying throughway-buckets, substantially as described.

2. An elastic-fluid-pressure turbine, of the de Laval type, consisting of two coaxial elements rotating in opposite directions, the one carrying expanding nozzles and the other carrying throughway-buckets said elements being mounted on shafts and rotating within a casing connected to the exhaust, substantially as described.

3. An elastic-fluid-pressure turbine of the de Laval type, consisting of two coaxial elements rotating in opposite directions, the one carrying expanding nozzles and the other carrying throughway-buckets said elements being mounted on shafts and rotating within a casing connected to the exhaust, in combination with packings to prevent leakage of the elastic fluid where said shafts pass through the walls of the casing, substantially as described.

4. An elastic-fluid-pressure turbine of the de Laval type, consisting of two coaxial elements, rotating in opposite directions, the one element being in the form of a hollow disk carrying expanding nozzles, and the other element being in the form of a disk carrying throughway-buckets, said elements being mounted on shafts and rotating within a casing connected to the exhaust in combination with packings to prevent leakage of the elastic fluid where said shafts pass through the walls of the casing, substantially as described.

5. An elastic-fluid-pressure turbine of the de Laval type, consisting of two coaxial elements, rotating in opposite directions, the one element being in the form of a hollow disk carrying expanding nozzles and communicating with the pressure-chest by way of the hollow shaft on which it is mounted and holes through the walls of said shaft, and the other element being in the form of a disk carrying throughway-buckets and also mounted on a shaft, said elements rotating within a casing connected to the exhaust in combination with packings to prevent leakage of the elastic fluid where said shafts pass through the walls of the casing, substantially as described.

6. An elastic-fluid-pressure turbine of the de Laval type, consisting of two coaxial elements rotating in opposite directions, the one element being in the form of a hollow disk carrying expanding nozzles and communicating with the pressure-chest by way of a hollow in the shaft on which it is mounted and holes through the walls of said shaft, and the other element being in the form of a disk carrying throughway-buckets and also mounted on a hollow shaft which contains part of the shaft on which the nozzle element is mounted, said elements rotating within a casing connected to the exhaust in combination with packings to prevent leakage of the elastic fluid where said shafts pass through the walls of the casing substantially as described.

7. In elastic-fluid-pressure turbines of the de Laval type, consisting of two coaxial elements rotating in opposite directions, the one element carrying expanding nozzles and the other carrying throughway-buckets, means for reversing, consisting of a separate set of reversed nozzles supplied with the working fluid through a separate set of passages and fed from a separate pressure-chest, and separate reversed buckets against which the reversed nozzles cause the fluid to impinge.

8. In elastic-fluid-pressure turbines of the de Laval type, consisting of two coaxial elements rotating in opposite directions, the one element carrying expanding nozzles and the other carrying throughway-buckets, means for reversing consisting of a set of reversed nozzles in combination with buckets carried by one of the rotating elements.

In witness whereof I have hereunto set my hand in presence of two witnesses.

CHARLES ALGERNON PARSONS.

Witnesses:
  HENRY G. DAHYUS, Jr.,
  WILLIAM DAGGETT.